United States Patent
Wild et al.

(10) Patent No.: US 6,726,001 B2
(45) Date of Patent: Apr. 27, 2004

(54) TRANSFER APPARATUS AND METHOD FOR FILM BAGS

(75) Inventors: Hans-Peter Wild, Zug (CH); Eberhard Kraft, Neckarbischofsheim (DE)

(73) Assignee: Indag Gesellschaft fuer Industriebedarf MbH & Co. Betriebs KG, Eppelheim/Heidelberg (DE)

(*) Notice: Subject to any disclaimer, the term of this patent is extended or adjusted under 35 U.S.C. 154(b) by 0 days.

(21) Appl. No.: 10/165,236

(22) Filed: Jun. 7, 2002

(65) Prior Publication Data
US 2003/0000805 A1 Jan. 2, 2003

(30) Foreign Application Priority Data
Jun. 8, 2001 (DE) .......................... 101 27 896

(51) Int. Cl.7 .............................. B65G 47/26
(52) U.S. Cl. ...................... 198/433; 198/429
(58) Field of Search .................. 198/433, 432, 198/428, 429

(56) References Cited

U.S. PATENT DOCUMENTS

| | | | |
|---|---|---|---|
| 3,066,787 A | 12/1962 | Algeyer | |
| 5,381,884 A * | 1/1995 | Spatafora et al. | 198/433 |
| 5,579,893 A | 12/1996 | Mokler | |
| 5,884,749 A | 3/1999 | Goodman | |
| 6,283,694 B1 * | 9/2001 | Spatafora et al. | 198/433 X |

FOREIGN PATENT DOCUMENTS

| | | | |
|---|---|---|---|
| DE | 1909295 | * 11/1969 | ............... 198/429 |
| DE | 29721583 U1 | 8/1998 | |
| EP | 0 563 461 A1 | 4/1992 | |
| EP | 1247770 A2 | 10/2002 | |
| FR | 1533856 | 7/1968 | |
| WO | WO 01/32510 A1 | 5/2001 | |

* cited by examiner

Primary Examiner—James R. Bidwell
(74) Attorney, Agent, or Firm—Marshall, Gerstein & Borun LLP

(57) ABSTRACT

A method and an apparatus for transferring film bags which are supplied in a plurality of parallel rows to a transfer station, to a conveying means which further transports the film bags in a continuous row substantially in a direction transverse to the direction of supply, the film bags to be handed over being preaccelerated in the direction of movement of the conveying means.

39 Claims, 4 Drawing Sheets

TRANSFER APPARATUS AND METHOD FOR FILM BAGS

FIELD OF THE INVENTION

The present invention relates to a method for transferring film bags which are supplied by a supply means in a plurality of parallel rows to a conveying means which further transports the film bags in a continuous row, and to an apparatus for performing the method.

BACKGROUND OF THE INVENTION

Nowadays, film bags which are used as packing means are mostly treated automatically, for instance filled, closed and further processed. Such film bags consist e.g. of two side films that are sealed to one another at three edges and between the fourth edge of which a bottom film is sealed in that when said bottom film is unfolded room is created in the film bag for the filled product.

In such an automated processing line, several film bags are often treated side by side at the same time. For instance, a number of film bags are simultaneously opened in a filling means, further transported by a transportation device, filled at the same time, further transported again and then closed at the same time.

However, at other points of the processing line, the film bags must be supplied individually to a processing station. A typical example is e.g. the application of drinking straws to beverage film bags.

This creates the problem that the film bags must be transferred by a transportation means which supplies a number of film bags in parallel, to another transportation means from which the film bags are discharged in a single row for further processing. This results in a discontinuous operation because a supplied number, corresponding to the row number supplied in parallel, must always be handed over simultaneously while the conveying means is at a standstill. Moreover, on account of the speeds nowadays used in such processing systems, strong acceleration and deceleration forces are created during transfer, which especially in the case of film bags may easily cause damage.

SUMMARY OF THE INVENTION

Said object is achieved by a method comprising the features of claim 1 and by an apparatus comprising the features of claim 6. Advantageous developments are the subject matter of the respective subclaims.

According to the method of the invention a respective number of film bags which are simultaneously supplied to a transfer station are received all at once by a transfer device, preaccelerated by said device in the direction of movement of the conveying means, discharged to the conveying means and then transported away by the latter substantially in a direction perpendicular to the direction of supply. The method according to the invention permits a continuous operation. While a number of film bags are being transported by the transfer device to the conveying means and handed over to the latter, a further number of film bags are supplied by the supply means to the transfer station. On the other hand, the conveying means continues its travel, transporting away already transferred film bags for further processing while the transfer device takes over a new number of film bags from the supply means and transports the bags to the conveying means. With a corresponding setting of the relative speed between the supply means and the conveying means a continuous operation is thereby ensured. Moreover, the preacceleration of the received film bags in the conveying direction has the effect that the acceleration forces are reduced upon discharge to the conveying means. Thus, damage upon discharge to the conveying means is prevented. Small acceleration forces during discharge also enhance the accuracy of the positioning operation for the bags on the conveying means The method according to the invention is particularly efficient when the speeds of the conveying means and of the transfer device are matched such that the conveying means transports away a number of film bags which have simultaneously been handed over, within the same period in which the transfer device has received a further identical number of film bags and transported and preaccelerated the same for discharge to the conveying means. It is thereby ensured that the capacity of the conveying means is exploited in an optimum way because no irregular distances on the discharge device can be created between the individual film bags. Moreover, this facilitates the further processing in automated processing stations.

Advantageously, in the method of the invention the relative speed between the conveying means and the film bags at the moment of discharge to the conveying means may be zero or almost zero. Thus, acceleration forces acting on the film bags are entirely avoided during discharge, whereby the risk of damage to the film bags is further reduced and the accuracy of the bag positioning operation is increased.

The film bags are simply transported away by the conveying means in a slightly inclined position. Such an inclined position permits an easy discharge operation because the film bags are held on the discharge device on account of their inclined position.

The film bags can directly be deposited on the conveying means by the transfer device However, it is easier when the film bags are lifted from the supply means, transported via the conveying means and released at said place. The demands made on a precise discharging operation are thereby reduced.

For performing the method of the invention, the apparatus according to the invention comprises a supply means which supplies film bags in parallel rows, a conveying means which transports away the film bags in a continuous row substantially in a direction perpendicular to the supply direction, and a transfer device which takes over from the supply means a respective number of film bags corresponding to the number of supplied rows, preaccelerates said bags in the direction of movement of the conveying means and discharges the same to the conveying means.

The transfer device can perform the individual movements e.g. in the manner of a robot controlled by a microprocessor. A particularly simple configuration is however a transfer device which comprises a carrier, a transverse bar parallel thereto with carrier means for the film bags and at least one lever arm which interconnects the transverse bar and the carrier, the connections being designed such that the angle enclosed by the lever arm with the carrier or transverse bar is variable. Such an arrangement permits a preacceleration of the received film bags in an easy way by varying the angle.

Such a construction is particularly stable if at least two lever arms are provided so that the carrier, the lever arms and the transverse bar form a parallelogram of a variable angle.

The angle can be varied in various ways. One simple possibility consists in pivoting a lever arm with the help of a motor. Said motor can be controlled such that upon discharge of the film bags the transverse bar and the conveying means have a relative speed of zero or almost zero. Acceleration forces can thus not act on the film bags during the discharge operation, which reduces the risk of damage. Advantageously, the movement of the transverse bar in the area of the conveying means is so high that it is slightly higher than a film bag positioned on the conveying means. It is thereby avoided that the movement of the transverse bar might impede the transportation of the film bags. Moreover, it is thereby easily possible to release the film bags to the conveying means, which represents a simple possibility of discharge.

To this end the transverse bar can perform a lifting movement during the transfer operation. To this end a linkage guide is just provided that effects the lifting movement during change in the angle between the at least one lever arm and the carrier. Such a linkage guide represents a possible configuration that is simple, mechanical and inexpensive. The lift can also be carried out pneumatically or by a motor.

The carrier means may comprise clamps on the transverse bar that are capable of gripping the film bags at the upper end thereof. The supply means may be an endless belt on which a number of film bags are conveyed in parallel.

Receiving cases in which the film bags are supplied may be arranged on the endless belt. The supply means may consist of chains extending in parallel and including receiving cases mounted thereon, in which the film bags are supplied.

The discharge means may e.g. comprise a transportation belt. Advantageously, holding means are provided on such a transportation belt, the film bags being transported in said means. Such holding means ensure a safe transportation. Such a safe transportation can be realized in a particularly easy manner when the holding means are designed such that the film bags are transported in a slightly inclined position.

BRIEF DESCRIPTION OF THE DRAWINGS

It may here be that the film bags are directly transported away side by side. In an advantageous embodiment, however, the holding means comprise side guides for the film bags that ensure a regular arrangement of the film bags on the transportation belt in an easy way.

An embodiment of the apparatus of the invention and the method of the invention shall now be explained in more detail with reference to the enclosed figures, in which.

DETAILED DESCRIPTION OF THE INVENTION

Figure 1A:
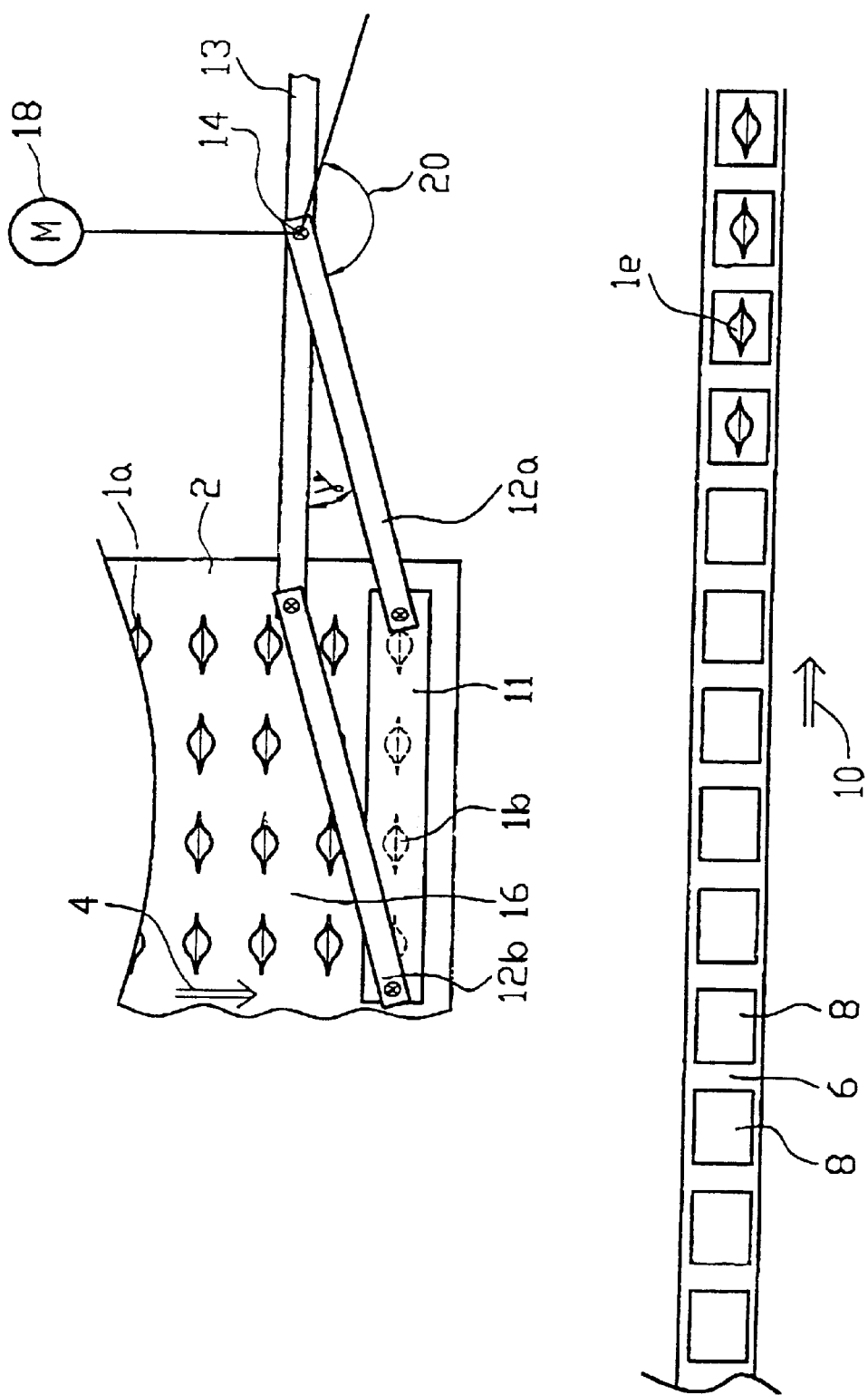
FIG. 1a is a schematic top view on a transfer station at the moment when the film bags are received.
Figure 1B:
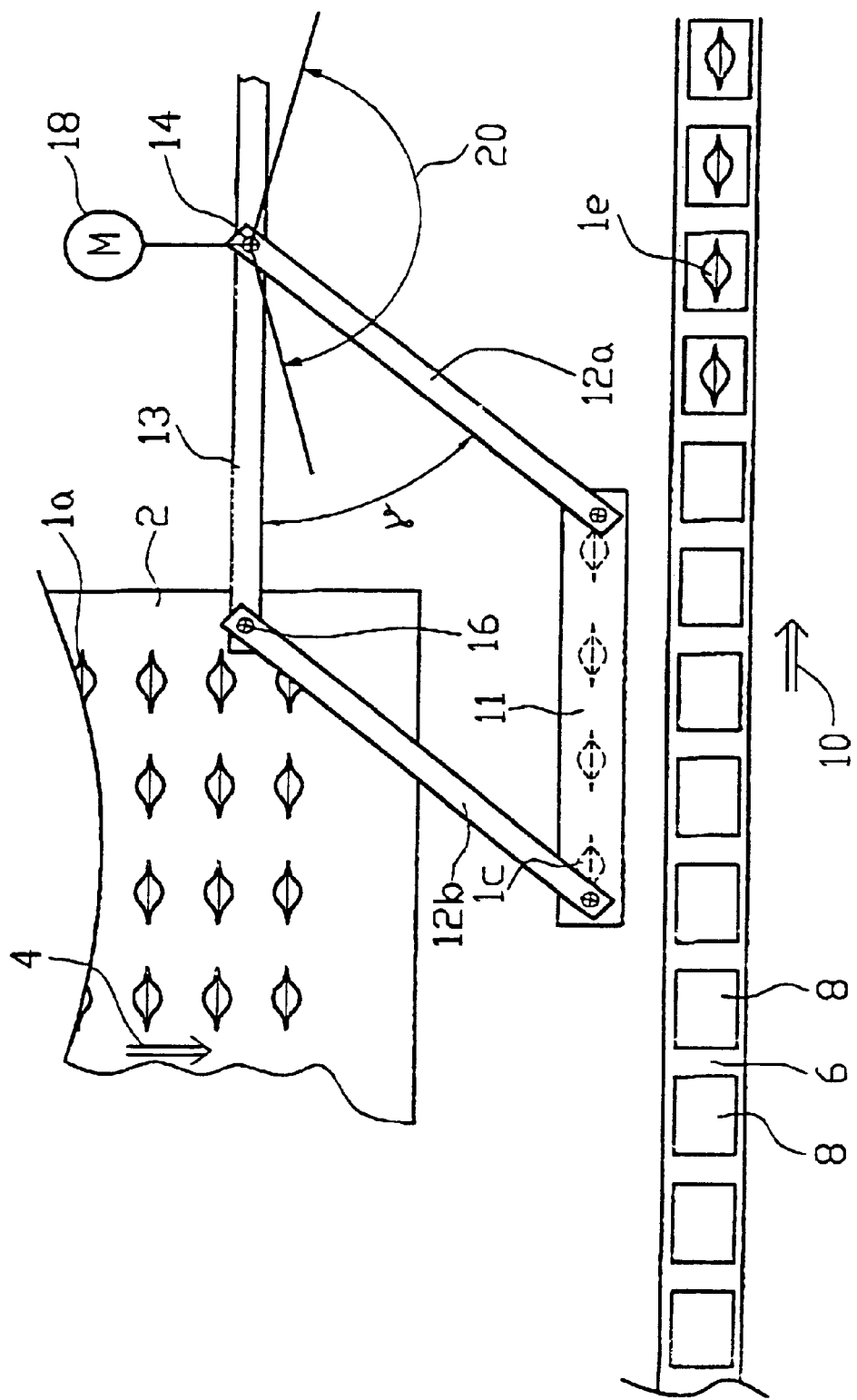
FIG. 1b is a schematic top view on a transfer station in an intermediate state.
Figure 1C:
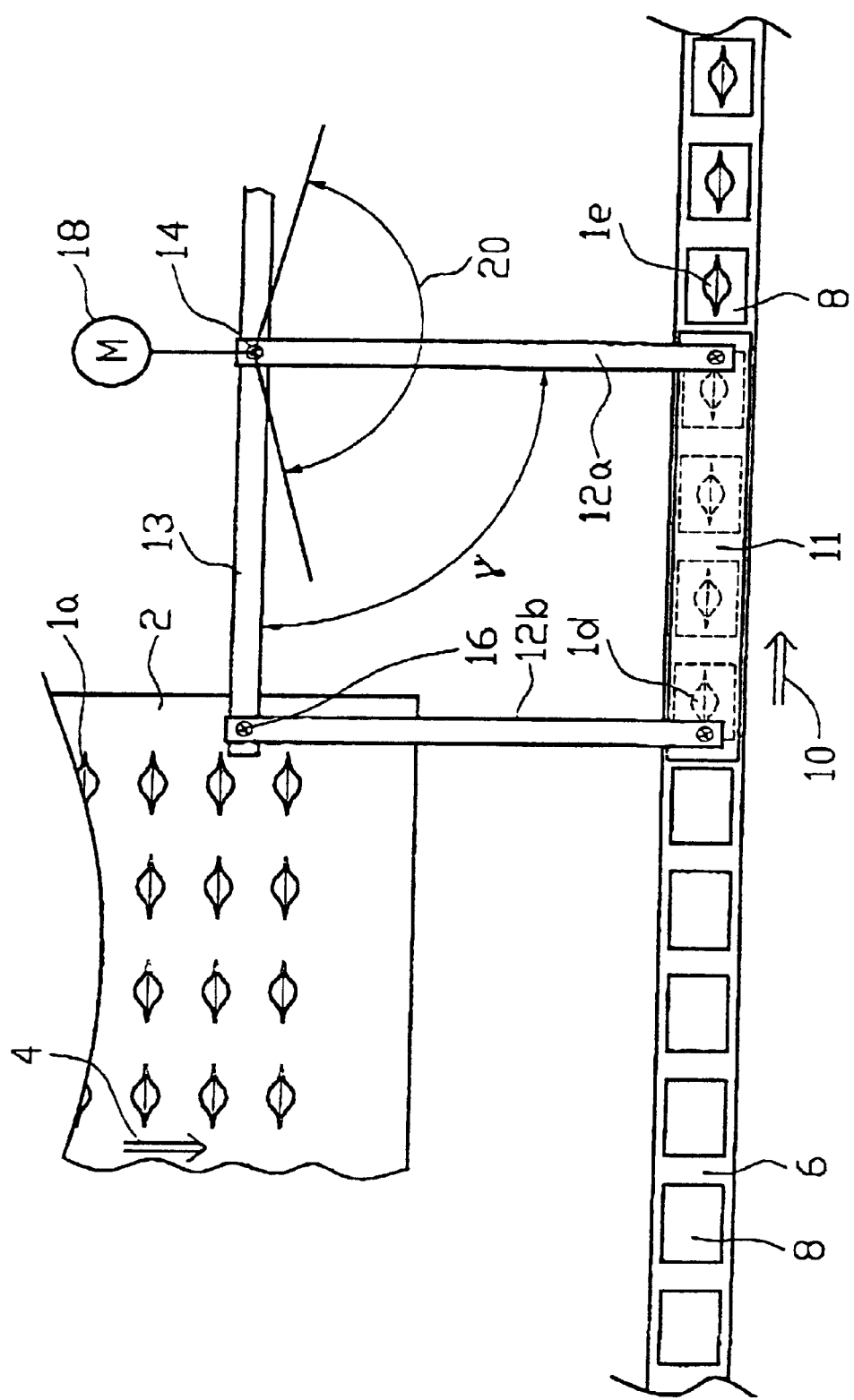
FIG. 1c is a schematic top view on a transfer station at the moment when the film bags are discharged.

FIGS. 1a to 1c show the transfer region. Such a transfer region is e.g. found in a beverage filling system. Beverage film bags 2 which have been filled and closed are discharged with the help of the transfer device to a conveying means which conveys the beverage film bags e.g. to a drinking-straw applying station.

Filled and closed beverage film bags 1a are supplied by a supply means 2 in supply direction 4.

13 designates a carrier which at pivotal points 14 and 16 has hinged thereto pivotable lever arms 12a, 12b. A motor 18 is provided for the pivotal movement in the direction of arrow 20. 11 designates a transverse bar having a bottom side provided with clamp means, which are not explicitly shown in FIG. 1a to c. Film bags 1b which are taken over by the transverse bar 11 are shown in broken line in FIG. 1. The transverse bar 11, the two lever arms 12a, 12b and the carrier 13 form a parallelogram of a variable angle γ.

6 designates a conveying means which moves in direction of arrow 10. Holding means 8 are positioned on said conveying means 6. 1e designates beverage film bags which are already conveyed.

FIG. 1b shows the same transfer station at a later time at which angle γ between the lever arms and the carrier is enlarged. 1c designates film bags which are transported in suspended fashion by the transverse bar 11

FIG. 1c, in turn, shows the same transfer station at the time when the film bags 1d are discharged from the transverse bar 11 to the conveying means 6.

Figure 2:
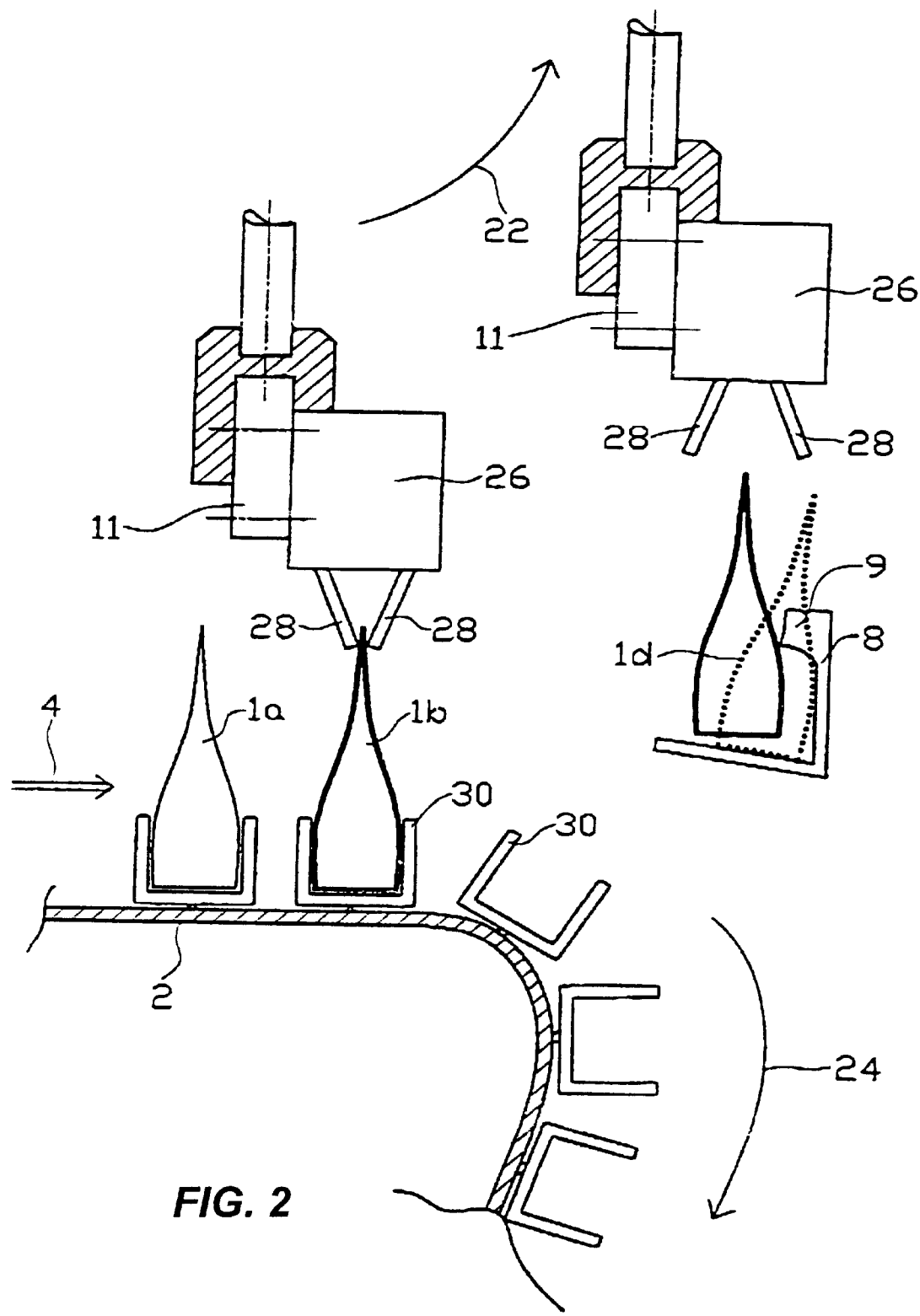
FIG. 2 is a lateral schematic view for illustrating the whole transfer operation.

FIG. 2 is a lateral schematic drawing of the same transfer station. A clamp mechanism 26 with clamps 28 is provided on the transverse bar 11. Arrow 24 designates the return direction of the emptied receiving cases 30 in which the film bags 1a have been supplied.

Arrow 22 shows the lifting movement of the transverse bar 11 which, as will still be described, is initiated during the pivotal operation of the lever arms 12a, 12b.

The right upper half of FIG. 2 illustrates a state of the transfer station at a later time, in which after the lifting movement 22 the clamps 28 are opened above the holding means 8 of the conveying transportation belt 6. 9 designates lateral guides of said holding means 8. This illustration shows that the bottom surface 8 of the holding means is inclined and the holding means only comprise one rear wall. The continuous line shows a film bag shortly after the clamps 28 have been opened. A film bag which a moment later rests on the rear wall of the holding means is shown in broken line.

The method according to the invention shall now be explained with reference to the mode of operation of the apparatus according to the invention by way of an exemplary transfer device in a machine for filling beverage film bags.

The beverage film bags are supplied by the supply means 2 in parallel rows. Any desired number of parallel rows is here possible. The beverage film bags 1a are transported in receiving cases 30 which are fastened to the supply means 2.

As shown in the left half of FIG. 2 and in FIG. 1a, respectively, clamps 28 engage the beverage film bags 1b in the transfer region. As soon as the clamps 28 have been closed, the motor 18 starts to move the lever arm 12a in direction 20. This creates a state as shown in FIG. 1b.

While the beverage film bags 1c are transported away from the supply means 2 with the help of the transverse bar 11 and the clamps 28, the supply device 2 moves on continuously to move a further number of beverage film bags into the transfer region. While the beverage film bags 1c are transported away, a lifting movement of the transverse bar 11 is initiated. To this end a linkage guide is e.g. provided which for reasons of clarity is not explicitly shown in the figures; a motor type drive or a pneumatic drive serves as an alternative. A simple configuration is e.g. a ramp against which the lever arms 12a and 12b, respectively, abut while being pivoted by the motor 18.

The lever arms 12 and 12b are pivoted along the arc represented by arrow 20 continuously up to the state shown in FIG. 1c. The speed of the pivotal movement is here chosen such that at the time shown in FIG. 1c the transverse bar 11 has the same speed in conveying direction 10 as the transportation belt 6.

In this state the clamps 28 are e.g. opened by a control means and the film bags 1d fall into the holding means 8 positioned thereunder. In this process they are aligned by the side guides 9 in their lateral position. As shown in FIG. 2, the holding means 8 are equipped with a slightly inclined bottom surface so that the film bags come to rest in an inclined way. Since the transportation belt 6 is continuously moved with the holding means 8, the film bags 1e are continuously conveyed after ejection. The relative speed of the film bags 1d and of the transportation belt 6 in the discharge process is zero or almost zero, so that acceleration forces that might damage the film bags are not acting on the film bags.

Upon release the pivotal movement of the lever arms 12a and 12b is continued, as shown by arrow 20 in FIGS. 1a to 1c. Finally, the pivotal movement of the lever arms 12a and 12b is reversed and the transverse bar is again returned along the same path which is illustrated in FIGS. 1a to 1c and has been described above.

The linkage guide is traveled through in reverse direction. Alternatively, it is also possible to use a motor type drive or a pneumatic drive. Since the lifting movement 22 has lifted the transverse bar to a height sufficiently above the transportation belt 6, it is ensured that the clamps 28 during the return movement of the transverse bar 11 will not collide with the already deposited film bags 1e.

The pivotal return movement is continued until the state shown in FIG. 1a is reached again, and the transfer operation is repeated with the next number of film bags While the transverse bar 11 is further pivoted or pivoted back after the discharge operation shown in FIG. 1c, and while a new number of film bags 1b are taken over on the transverse bar with the clamps 28 and moved to the transportation belt 6, said belt is continuously moving on. With a suitably timed coordination, the transportation belt 6 is thus advanced further exactly by such a distance that the film bags 1d can be ejected onto the transportation belt 6 directly in accordance with the previously discharged number of film bags.

Thus the above-described apparatus and the associated method make it possible that two continuously conveying transportation belts can be used and that a transfer is possible although on the one transportation belt quite a number of film bags are simultaneously conveyed to the transfer station while the other conveying means discharges a single continuous row. Such a continuous supply and discharge facilitates the integration of such a transfer device into an automated processing system. Thanks to the preacceleration of the film bags to the speed of the conveying transportation belt, the risk of damage to the film bags is reduced in addition to an acceleration of the whole process.

We claim:

1. A method for transferring film bags, e.g. beverage film bags, comprising supplying a plurality of film bags in a supply direction (4) by a supply means (2) in a plurality of parallel rows to a transfer station, simultaneously receiving a number of the supplied film bags (1b, 1c, 1d) by a transfer device (11) from said supply means (2), wherein said transfer device comprises a carrier (13), a transverse bar (11) parallel thereto with support means (28) for said film bags (1c), and at least one lever arm (12a, 12b) which connects said transverse bar (11) and said carrier (13), the angle enclosed by said at least one lever arm (12a, 12b) with said carrier (13) or transverse bar (11) being variable, preaccelerating said transfer device with said number of received film bags in a direction (10) transverse to the supply direction (4), discharging said number of received film bags by said transfer device (11) to a conveying means (6), and further transporting said film bags (1e) away in a continuous row in said transverse direction (10).

2. The method according to claim 1, and coordinating the movements of said conveying means (6) and said transfer device (11) such that said conveying means (6) transports away a number of film bags (1e), which have simultaneously been transferred by said transfer device (11), within the same period of time during which said transfer device (11) has received a further identical number of film bags (1b, 1c, 1d) and transported and preaccelerated said bags for discharge to said conveying means (6).

3. The method according to claim 1 or 2, wherein the relative speed of said conveying means (6) and of said film bags (1d) at the moment of discharge to said conveying means is one of zero or almost zero.

4. The method according to claim 1, and transporting away said film bags (1e) by said conveying means (6) in a slightly inclined position.

5. The method according to claim 4, and lifting said film bags (1b) from said supply means (2) when being received and releasing said film bags (1b) upon discharge to said conveying means (6).

6. An apparatus for transferring film bags, such as beverage film bags, comprising a supply means (2) which supplies film bags (1a) in parallel rows, a conveying means (6) which transports away said film bags (1e) in a continuous row in a direction substantially perpendicular to the supply direction, and a transfer device (11) which takes over a respective number of film bags (1b) equal to the number of said supplied rows, from said supply means (2), preaccelerates said bags in the direction of movement of said conveying means (6) and discharges said bags to said conveying means (6), wherein said transfer device comprises a carrier (13), a transverse bar (11) parallel thereto with support means (28) for said film bags (1c), and at least one lever arm (12a, 12b) which connects said transverse bar (11) and said carrier (13), the angle enclosed by said at least one lever arm (12a, 12b) with said carrier (13) or transverse bar (11) being variable.

7. The apparatus according to claim 6, wherein said conveying means comprises a transportation belt (6).

8. The apparatus according to claim 6, wherein at least two lever arms (12a, 12b) are provided, and said carrier (13), said lever arms and said transverse bar (11) form a parallelogram of a variable angle (γ).

9. The apparatus according to claim 8, wherein said angle (γ) can be varied with the help of a motor (18) which pivots a lever arm (12a).

10. The apparatus according to claim 9, wherein said motor (18) is controlled such that said transverse bar (11) and said conveying means (6) have the relative speed said motor (18) is controlled such that said transverse bar (11) and said conveying means (6) have the relative speed of zero or almost zero during discharge of said film bags (1d).

11. The apparatus according to claim 6, wherein said transfer device is designed such that the movement of said transverse bar (11) in the area of said conveying means (6) is so high that it is slightly higher than a film bag (1d, 1e) positioned on said conveying means (6).

12. The apparatus according to claim 11, wherein said transverse bar (11) performs a lifting movement (22) during the transfer operation.

13. The apparatus according to claim 12, wherein a linkage guide effects the lifting movement (22) during variation of said angle (γ) between said at least one lever arm (12a, 12b) and said carrier (13).

14. The apparatus according to claim 6, wherein said carrier means are provided on said transverse bar (11) with clamps (28) which are adapted to grip film bags (1b, 1c, 1d) at the upper end thereof.

15. The apparatus according to claim 6, wherein said supply means (2) is an endless belt on which a number of film bags (1a) are conveyed in parallel.

16. The apparatus according to claim 15, and receiving cases (30) in which said film bags (1a) are supplied are arranged on said endless belt (2).

17. The apparatus according to claim 6, wherein said supply means (2) are chains extending in parallel with receiving cases (30) mounted thereon, in which said film bags (1a) are supplied.

18. The apparatus according to claim 7, and holding means (8) for said film bags (1e) to be transported away are provided on said transportation belt (6).

19. The apparatus according to claim 18, wherein said holding means (8) are shaped such that said film bags (1e) are transported in a slightly inclined position.

20. The apparatus according to claim 7 or 18, wherein said holding means comprise side guides for said film bags (1e).

21. The apparatus according to claim 12, wherein said lift is effected by one of a pneumatic drive or a motor type drive.

22. A method for transferring film bags, e.g. beverage film bags, comprising supplying a plurality of film bags in a supply direction (4) by a supply means (2) in a plurality of parallel rows to a transfer station, simultaneously receiving a number of the supplied film bags (1b, 1c, 1d) by a transfer device (11) from said supply means (2), wherein said supply means (2) are chains extending in parallel with receiving cases (30) mounted thereon, in which said film bags (1a) are supplied, preaccelerating said transfer device with said number of received film bags in a direction (10) transverse to the supply direction (4), discharging said number of received film bags by said transfer device (11) to a conveying means (6), and further transporting said film bags (1e) away in a continuous row in said transverse direction (10).

23. The method according to claim 22, and transporting away said film bags (1e) by said conveying means (6) in a slightly inclined position.

24. The method according to claim 22, and coordinating the movements of said conveying means (6) and said transfer device (11) such that said conveying means (6) transports away a number of film bags (1e), which have simultaneously been transferred by said transfer device (11), within the same period of time during which said transfer device (11) has received a further identical number of film bags (1b, 1c, 1d) and transported and preaccelerated said bags for discharge to said conveying means (6).

25. The method according to claim 22, wherein the relative speed of said conveying means (6) and of said film bags (1d) at the moment of discharge to said conveying means is one of zero or almost zero.

26. The method according to claim 23, and lifting said film bags (1b) from said supply means (2) when being received and releasing said film bags (1b) upon discharge to said conveying means (6).

27. A method for transferring film bags, e.g. beverage film bags, comprising supplying a plurality of film bags in a supply direction (4) by a supply means (2) in a plurality of parallel rows to a transfer station, simultaneously receiving a number of the supplied film bags (1b, 1c, 1d) by a transfer device (11) from said supply means (2), preaccelerating said transfer device with said number of received film bags in a direction (10) transverse to the supply direction (4), discharging said number of received film bags by said transfer device (11) to a conveying means (6), and further transporting said film bags (1e) away in a continuous row in said transverse direction (10), wherein said conveying means (6) comprises a transportation belt having a holding means (8) for said film bags (1e) to be transported away.

28. The method according to claim 27, and transporting away said film bags (1e) by said conveying means (6) in a slightly inclined position.

29. The method according to claim 27, and coordinating the movements of said conveying means (6) and said transfer device (11) such that said conveying means (6) transports away a number of film bags (1e), which have simultaneously been transferred by said transfer device (11), within the same period of time during which said transfer device (11) has received a further identical number of film bags (1b, 1c, 1d) and transported and preaccelerated said bags for discharge to said conveying means (6).

30. The method according to claim 27, wherein the relative speed of said conveying means (6) and of said film bags (1d) at the moment of discharge to said conveying means is one of zero or almost zero.

31. The method according to claim 28, and lifting said film bags (1b) from said supply means (2) when being received and releasing said film bags (1b) upon discharge to said conveying means (6).

32. An apparatus for transferring film bags, such as beverage film bags, comprising a supply means (2) which supplies film bags (1a) in parallel rows, wherein said supply means (2) are chains extending in parallel with receiving cases (30) mounted thereon, in which said film bags (1a) are supplied, a conveying means (6) which transports away said film bags (1e) in a continuous row in a direction substantially perpendicular to the supply direction, and a transfer device (11) which takes over a respective number of film bags (1b) equal to the number of said supplied rows, from said supply means (2), preaccelerates said bags in the direction of movement of said conveying means (6) and discharges said bags to said conveying means (6).

33. The apparatus according to claim 32, wherein said conveying means comprises a transportation belt (6).

34. The apparatus according to claim 33, and holding means (8) for said film bags (1e) to be transported away are provided on said transportation belt (6).

35. The apparatus according to claim 34, wherein said holding means (8) are shaped such that said film bags (1e) are transported in a slightly inclined position.

36. The apparatus according to claim 33, wherein said holding means comprise side guides for said film bags (1e).

37. An apparatus for transferring film bags, such as beverage film bags, comprising a supply means (2) which supplies film bags (1a) in parallel rows, a conveying means (6) which transports away said film bags (1e) in a continuous row in a direction substantially perpendicular to the supply direction, and a transfer device (11) which takes over a respective number of film bags (1b) equal to the number of said supplied rows, from said supply means (2), preaccelerates said bags in the direction of movement of said conveying means (6) and discharges said bags to said conveying means (6), wherein said conveying means (6) comprises a transportation belt having a holding means (8) for said film bags (1e) to be transported away.

38. The apparatus according to claim 37, wherein said holding means comprise side guides for said film bags (1e).

39. The apparatus according to claim 37, wherein said holding means (8) are shaped such that said film bags (1e) are transported in a slightly inclined position.

* * * * *